(12) United States Patent
Tsai (10) Patent No.: US 11,124,366 B2
(45) Date of Patent: Sep. 21, 2021

(54) INSPECTION APPARATUS FOR DISPLAY PANEL AND TESTING METHOD FOR DISPLAY PANEL

(71) Applicants: HKC Corporation Limited, Shenzhen (CN); Chongqing HKC Optoelectronics Technology Co., Ltd., Chongqing (CN)

(72) Inventor: Chia-Jen Tsai, Chongqing (CN)

(73) Assignees: HKC Corporation Limited, Shenzhen (CN); Chongqing HKC Optoelectronics Technology Co., Ltd., Chongqing (CN)

( * ) Notice: Subject to any disclaimer, the term of this patent is extended or adjusted under 35 U.S.C. 154(b) by 10 days.

(21) Appl. No.: 16/633,490

(22) PCT Filed: Dec. 14, 2017

(86) PCT No.: PCT/CN2017/116296
§ 371 (c)(1),
(2) Date: Jan. 23, 2020

(87) PCT Pub. No.: WO2019/029078
PCT Pub. Date: Feb. 14, 2019

(65) Prior Publication Data
US 2020/0377303 A1    Dec. 3, 2020

(30) Foreign Application Priority Data
Aug. 8, 2017 (CN) .......................... 201710672043.8

(51) Int. Cl.
*B65G 23/08*    (2006.01)
*B65G 23/44*    (2006.01)
(Continued)

(52) U.S. Cl.
CPC ............. *B65G 23/08* (2013.01); *B65G 23/44* (2013.01); *B65G 29/00* (2013.01); *B65G 47/912* (2013.01);
(Continued)

(58) Field of Classification Search
CPC ........ B65G 23/08; B65G 23/44; B65G 29/00; B65G 47/912; B65G 2201/022;
(Continued)

(56) References Cited

U.S. PATENT DOCUMENTS

| 9,957,112 B1 * | 5/2018 | Xu ......................... G02F 1/1303 |
| 2005/0123387 A1 * | 6/2005 | Pollack ................. H01L 21/681 414/222.01 |

(Continued)

FOREIGN PATENT DOCUMENTS

CN    104483765    * 11/2017    .............. G02F 1/13

*Primary Examiner* — James R Bidwell
(74) *Attorney, Agent, or Firm* — Wang Law Firm, Inc.

(57) ABSTRACT

The present disclosure illustrates an inspection apparatus for a display panel and a testing method for display panel. The inspection apparatus includes a platform, a feeding device, a rotatable bearing stage, an optical panel inspection device, a discharging device, a rotation driving device and a transfer device. The platform includes a support frame having a loading-and-unloading area and an inspection area. The feeding device transports the display panel along a feeding direction. The rotation driving device includes a rotation axis and a rotation driving mechanism. The rotation axis has an end fixed at a central part of a bottom surface of the rotatable bearing stage, and the rotation driving mechanism can rotate the rotation axis. The display panel placed on the rotatable bearing stage can be exchanged between the loading-and-unloading area and the inspection area when the rotatable bearing stage is rotated.

19 Claims, 4 Drawing Sheets

(51) Int. Cl.
*B65G 29/00* (2006.01)
*B65G 47/91* (2006.01)
*G01N 21/95* (2006.01)

(52) U.S. Cl.
CPC ....... *G01N 21/95* (2013.01); *B65G 2201/022* (2013.01)

(58) Field of Classification Search
CPC ........ B65G 23/04; G01N 21/95; G01N 21/88; G01N 3/00; G01N 1/13
See application file for complete search history.

(56) References Cited

U.S. PATENT DOCUMENTS

| | | | | |
|---|---|---|---|---|
| 2013/0185884 | A1* | 7/2013 | Ko | B08B 1/006 15/209.1 |
| 2015/0298271 | A1* | 10/2015 | Murata | B23Q 7/1494 414/222.07 |

* cited by examiner

INSPECTION APPARATUS FOR DISPLAY PANEL AND TESTING METHOD FOR DISPLAY PANEL

CROSS-REFERENCE TO RELATED APPLICATION

This application claims priority to China Patent Application No. 201710672043.8 filed on Aug. 8, 2017, and entitled "Display panel detection device and display panel detection method" at State Intellectual Property Office of the P.R.C., the entirety of which is hereby incorporated by reference.

BACKGROUND OF THE INVENTION

1. Field of the Invention

The present disclosure relates to a display panel manufacturing technology field, more particularly to an inspection apparatus for a display panel and testing method for a display panel.

2. Description of the Related Art

In recent years, the flat-panel display technologies include liquid crystal display (LCD) technology, plasmon display panel (PDP) technology, electro Luminescence display (ELD) technology, organic light-emitting diode (OLED) technology, vacuum fluorescent display (VFD) technology, field emission display (FED) technology, and so on. After cutting process, above-mentioned flat-panel display panels all must be tested to filter out unqualified panels.

In a conventional display panel inspection apparatus, two auto panel inspection devices are arranged in a production line after the cutting process, and a working time (Tact Time) of the optical panel inspection device is 25 seconds substantially. The working time mainly includes the panel exchanging time plus the auto inspection time, and the panel exchanging time is the time of loading and unloading the display panel. However, in the conventional display panel inspection apparatus, the operations of loading and unloading the display panel cannot be performed while the display panel is being inspected, so it is hard to optimize the panel exchanging time. Hence, the inspection and the loading-and-unloading operation cannot be performed at the same time, and it causes lower inspection efficiency, longer inspection time, and high cost.

SUMMARY OF THE INVENTION

An objective of the present disclosure is to provide an inspection apparatus, so as to solve the conventional technical problem that the inspection and the loading-and-unloading operation cannot be performed at the same time in the conventional display panel inspection apparatus, and the problem of lower inspection efficiency, longer inspection time, and high cost.

In order to achieving the objective, the present disclosure provides an inspection apparatus for a display panel which includes a platform, a feeding device, a rotatable bearing stage, an optical panel inspection device, a discharging device, a rotation driving device and a transfer device. The platform includes a bottom plate and a support frame disposed on the bottom plate, and the support frame comprises a loading-and-unloading area and an inspection area. The feeding device is configured to transport the display panel along a feeding direction, and disposed at a side of the platform. The rotatable bearing stage is configured to place the display panel thereon. The optical panel inspection device is configured to inspect the display panel placed on the rotatable bearing stage in the inspection area, and the optical panel inspection device is disposed on the support frame. The discharging device is configured to transport, along the feeding direction, the display panel inspected by the optical panel inspection device. The discharging device is disposed at the other side of the platform opposite to the feeding device. The rotation driving device is fastened on the support frame and comprising a rotation axis and a rotation driving mechanism. The rotation axis has an end fixed at a central part of a bottom surface of the rotatable bearing stage, and the rotation driving mechanism is configured to rotate the rotation axis, an axis of the rotation axis is perpendicular to the bottom plate, and the display panel placed on the rotatable bearing stage can be exchanged between the loading-and-unloading area and the inspection area when the rotatable bearing stage is rotated. The transfer device is configured to transfer the display panel from the feeding device to a surface of the rotatable bearing stage in the loading-and-unloading area, and transfer the inspected display panel from the loading-and-unloading area to the discharging device after the display panel is inspected by the optical panel inspection device.

Preferably, the transfer device includes a sliding rail extended along a direction in parallel with the feeding direction; at least two transport devices slidably disposed on the sliding rail and configured to pick up the display panel; and a transport mechanism configured to move the transport device.

Preferably, the transport device includes a connection base connected to the sliding rail; a lifting frame slidably disposed on the connection base; a lift driving member configured to move the lifting frame relative to the connection base; and a panel pickup mechanism disposed on the lifting frame.

Preferably, the lifting frame includes a connection support connected to the connection base; and a fixed support connected to the connection support. The fixed support includes at least two rods extended along a direction in parallel with the feeding direction; and at least two second rods perpendicular to a first rod. The panel pickup mechanism includes at least one pair of clamping rods slidably disposed on the second rod and extended along a direction in parallel with the feeding direction; and a clamp driving member configured to move the at least one pair of clamping rods opposite to each other. Each of the clamping rods includes a contact member configured to contact against a side wall of the display panel, and each of at least one pair of clamping rods are moved towards each other to clamp the two sides of the display panel.

Preferably, the feeding device includes a feeding transmission belt configured to place the display panel thereon; and a feeding transmission mechanism configured to rotate the feeding transmission belt. The feeding transmission mechanism includes a feed drive wheel; a feed driven wheel; and a feeding motor configured to drive the feed drive wheel to rotate. The feeding transmission belt is wound on the feed drive wheel and the feed driven wheel.

Preferably, the discharging device includes a discharging transmission belt configured to place the display panel thereon; and a discharging transmission mechanism configured to rotate the discharging transmission belt. The discharging transmission mechanism includes a discharge drive wheel; a discharge driven wheel; and a discharging motor configured to drive the discharge drive wheel to rotate. The discharging transmission belt is wound on the discharge drive wheel and the discharge driven wheel.

Preferably, the rotation driving mechanism includes an electric rotating machine comprising an output shaft, the electric rotating machine is fixed on the support frame, and the output shaft of the electric rotating machine is connected to and fixed with the rotation axis.

Preferably, the optical panel inspection device is configured to inspect the display panel placed on the rotatable bearing stage in the inspection area, and the optical panel inspection device includes a probe mechanism, a high-powered microscope head and a charge-coupled device.

In order to achieve the objective, the present disclosure provides an inspection apparatus for a display panel. The inspection apparatus includes a platform, a feeding device, a rotatable bearing stage, an optical panel inspection device, a discharging device, a rotation driving device and a transfer device. The platform includes a bottom plate and a support frame disposed on the bottom plate, and the support frame includes a loading-and-unloading area and an inspection area. The feeding device is configured to transport the display panel along a feeding direction, and disposed at a side of the platform. The rotatable bearing stage is configured to place the display panel thereon. The optical panel inspection device is configured to inspect the display panel placed on the rotatable bearing stage in the inspection area. The optical panel inspection device is disposed on the support frame. The discharging device is configured to transport, along the feeding direction, the display panel inspected by the optical panel inspection device. The discharging device is disposed at the other side of the platform opposite to the feeding device. The rotation driving device is fastened on the support frame and comprising a rotation axis and a rotation driving mechanism. The rotation axis has an end fixed at a central part of a bottom surface of the rotatable bearing stage, and the rotation driving mechanism is configured to rotate the rotation axis, an axis of the rotation axis is perpendicular to the bottom plate, and the display panel placed on the rotatable bearing stage is exchanged between the loading-and-unloading area and the inspection area when the rotatable bearing stage is rotated. The transfer device is configured to transfer the display panel from the feeding device to a surface of the rotatable bearing stage in the loading-and-unloading area, and transfer the inspected display panel from the loading-and-unloading area to the discharging device after the display panel is inspected by the optical panel inspection device. The transfer device includes a sliding rail extended along a direction in parallel with the feeding direction; at least two the transport devices slidably disposed on the sliding rail and configured to pick up the display panel; and a transport mechanism configured to move the transport device. The transport device includes a connection base connected to the sliding rail; a lifting frame slidably disposed on the connection base; a lift driving member configured to move the lifting frame relative to the connection base; and a panel pickup mechanism disposed on the lifting frame. Each of at least two the transport devices includes a horizontal sliding block disposed between the connection base and the lifting frame, and a sliding block driving member configured to move the horizontal sliding block relative to the connection base.

Preferably, the lifting frame includes a connection support connected to the connection base; and a fixed support connected to the connection support. The fixed support includes at least two the rods extended along a direction in parallel with the feeding direction; and at least two the second rods perpendicular to the first rod. The panel pickup mechanism includes at least one pair of clamping rods slidably disposed on the second rod and extended along a direction in parallel with the feeding direction; and a clamp driving member configured to move the clamping rods opposite to each other. Each of the clamping rods includes a contact member configured to contact against a side wall of the display panel, and the clamping rods are moved towards each other to clamp the two sides of the display panel.

Preferably, the feeding device includes a feeding transmission belt configured to place the display panel thereon; and a feeding transmission mechanism configured to rotate the feeding transmission belt. The feeding transmission mechanism includes a feed drive wheel; a feed driven wheel; and a feeding motor configured to drive the feed drive wheel to rotate. The feeding transmission belt is wound on the feed drive wheel and the feed driven wheel.

Preferably, the discharging device includes a discharging transmission belt configured to place the display panel thereon; and a discharging transmission mechanism configured to rotate the discharging transmission belt. The discharging transmission mechanism includes a discharge drive wheel; a discharge driven wheel; and a discharging motor configured to drive the discharge drive wheel to rotate. The discharging transmission belt is wound on the discharge drive wheel and the discharge driven wheel.

Preferably, the rotation driving mechanism includes an electric rotating machine comprising an output shaft, the electric rotating machine is fixed on the support frame, and the output shaft of the electric rotating machine is connected to and fixed with the rotation axis.

Preferably, the optical panel inspection device is configured to inspect the display panel placed on the rotatable bearing stage in the inspection area, and the optical panel inspection device includes a probe mechanism, a high-powered microscope head and a charge-coupled device.

In order to achieve the objective, the present disclosure provides a testing method for display panel including steps of: providing a platform, a feeding device, a rotatable bearing stage, an optical panel inspection device, a discharging device, a rotation driving device and a transfer device, wherein the platform includes a support frame having a loading-and-unloading area and an inspection area; using the transfer device to transfer the display panel on the feeding device to the rotatable bearing stage in the loading-and-unloading area; rotating the rotatable bearing stage to move the display panel from the loading-and-unloading area to the inspection area; using the optical panel inspection device to inspect the display panel in the inspection area; rotating the rotatable bearing stage to move the inspected display panel from the inspection area to the loading-and-unloading area; and using the transfer device to transfer the display panel from the rotatable bearing stage to the discharging device.

Preferably, the testing method for display panel further includes step of; disposing the platform between the feeding device and the discharging device.

Preferably, the step of using the optical panel inspection device to inspect the display panel in the inspection area, further includes: using the transfer device to transfer the display panel from the rotatable bearing stage to the discharging device; and using the transfer device to transfer the display panel from the feeding device to the rotatable bearing stage in the loading-and-unloading area.

Preferably, the step of providing the transfer device further includes: providing a sliding rail, at least two transport devices and a transport mechanism, wherein the sliding rail is extended in parallel with a direction in which the feeding device transports the display panel, and the at least two transport devices are slidably disposed on the sliding rail; using the at least two transport device to pick up the display panel; and using the transport mechanism to move the at least two transport devices.

Preferably, the step of providing at least two transport devices further includes: providing a base connected to the sliding rail; slidably disposing a lifting frame on the base; providing a lift driving member to move the lifting frame relative to the connection base; and disposing a panel pickup mechanism on the lifting frame.

The testing method for display panel further includes: disposing a horizontal sliding block between the connection base and the lifting frame; and providing a sliding block driving member to drive the horizontal sliding block to move relative to the connection base.

According to above-mentioned content, the inspection apparatus includes the platform, the feeding device, the rotatable bearing stage, the optical panel inspection device, the discharging device, the transfer device, and the rotation driving device. The support frame includes the loading-and-unloading area and the inspection area, and the display panel placed on the rotatable bearing stage can be exchanged between the loading-and-unloading area and the inspection area when the rotatable bearing stage is rotated. In other words, while the display panel placed on the rotatable bearing stage in the inspection area is being inspected, the inspected display panel on the rotatable bearing stage in the loading-and-unloading area can be transported to the discharging device and, at the same time, the next to-be-inspected display panel can be transported from the feeding device to the surface of the rotatable bearing stage in the loading-and-unloading area. As a result, the working time of the inspection apparatus can be reduced, and the production efficiency of the inspection apparatus 100 can be significantly improved.

BRIEF DESCRIPTION OF THE DRAWINGS

The structure, operating principle and effects of the present disclosure will be described in detail by way of various embodiments which are illustrated in the accompanying drawings.

DETAILED DESCRIPTION OF THE PREFERRED EMBODIMENTS

The following embodiments of the present disclosure are herein described in detail with reference to the accompanying drawings. These drawings show specific examples of the embodiments of the present disclosure. It is to be understood that these embodiments are exemplary implementations and are not to be construed as limiting the scope of the present disclosure in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

Spatially relative terms, such as "front", "rear", "right", "left", "above", "up", "below", "under" and the like, may be used herein for ease of description to describe one element or feature's relationship to another element(s) or feature(s) as illustrated in the figures. In the figures, X axis towards the front of the frame is the rear direction, Y axis is the left direction, and Z axis is the up direction.

It is to be understood that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

Figure 1:
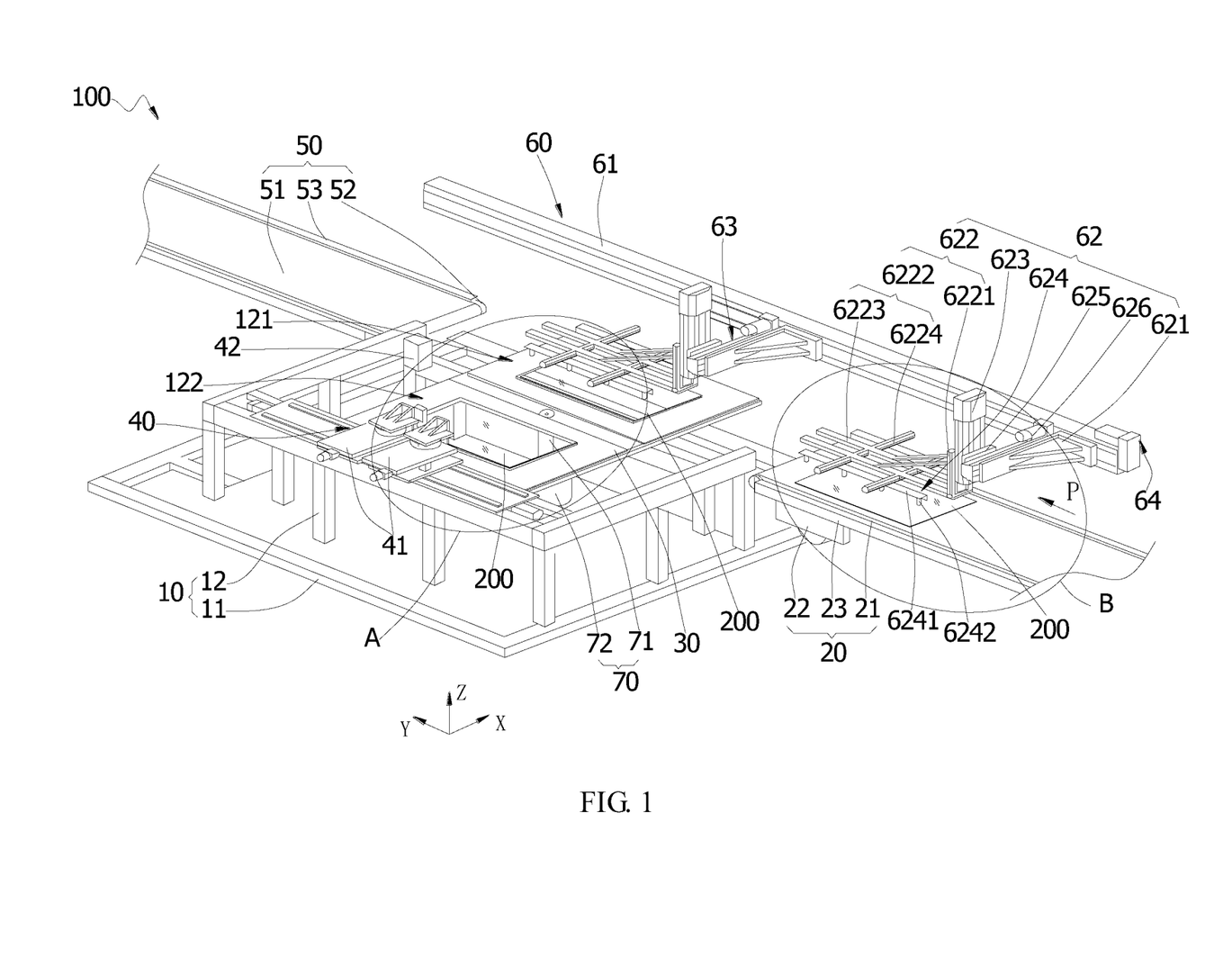
FIG. 1 is a perspective view of an inspection apparatus for a display panel, in accordance with an embodiment of the present disclosure.
Figure 2:
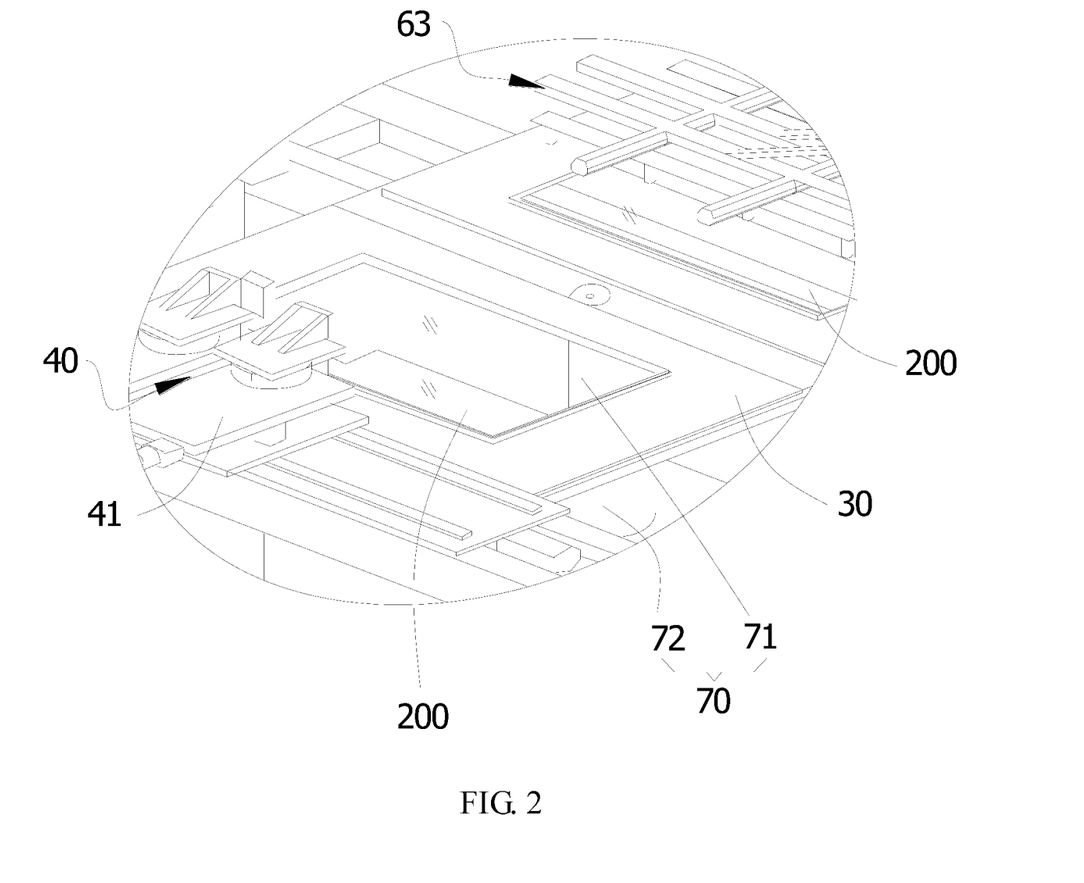
FIG. 2 is an expanded view of the A part of FIG. 1.
Figure 3:
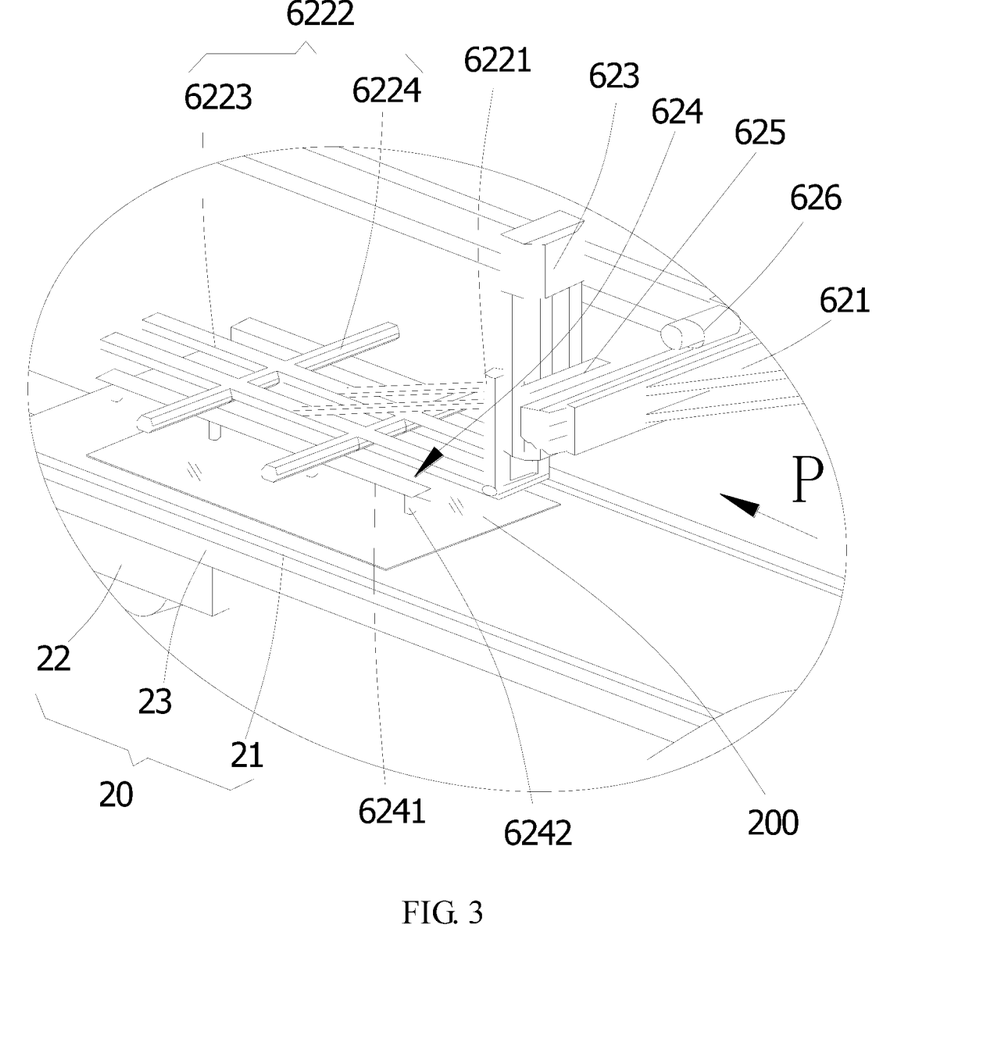
FIG. 3 is an expanded view of the B part of FIG. 1.

Please refer to FIGS. 1 through 3, which show an embodiment of the present disclosure.

This embodiment is to provide an inspection apparatus 100 of a display panel, and the inspection apparatus 100 includes a platform 10, a feeding device 20, a rotatable bearing stage 30, an optical panel inspection device 40, a discharging device 50, a transfer device 60 and a rotation driving device 70. The platform 10 includes a bottom plate and a support frame 12 disposed on the bottom plate 11. The support frame 12 includes a loading-and-unloading area 121 and an inspection area 122. The feeding device 20 is configured to transport the display panel 200 along a feeding direction P, and disposed at a side of the platform 10. The rotatable bearing stage 30 is configured to place the display panel 200 thereon. The optical panel inspection device 40 is configured to inspect the display panel 200 placed on the rotatable bearing stage 30 in the inspection area 122, and the optical panel inspection device 40 is disposed on the support frame 12. The discharging device 50 is configured to transport the display panel 200 which is inspected by the optical panel inspection device 40 already, along the feeding direction P. The discharging device 50 is disposed at the other side of the platform 10 opposite to the feeding device 20. The rotation driving device 70 includes a rotation axis 71 having an end fixed at a central part of a bottom surface of the rotatable bearing stage 30, and a rotation driving mechanism 72 configured to rotate the rotation axis 71. An axis of the rotation axis 71 is perpendicular to the bottom plate 11. The display panel 200 placed on the rotatable bearing stage 30 can be exchanged between the loading-and-unloading area 121 and the inspection area 122 when the rotatable bearing stage 30 is rotated. The transfer device 60 is configured to move the display panel 200 from the feeding device 20 to a surface of the rotatable bearing stage 30 in the loading-and-unloading area 121, and transfer the inspected display panel 200 from the loading-and-unloading area 121 to the discharging device 50 after the display panel 200 is inspected by the optical panel inspection device 40.

The inspection apparatus 100 includes the platform 10, the feeding device 20, the rotatable bearing stage 30, the optical panel inspection device 40, the discharging device 50, the transfer device 60 and the rotation driving device 70. The support frame 12 includes the loading-and-unloading area 121 and the inspection area 122, and the display panel 200 placed on the rotatable bearing stage 30 can be exchanged between the loading-and-unloading area 121 and the inspection area 122 when the rotatable bearing stage 30 is rotated. In other words, while the display panel 200 placed on the rotatable bearing stage 30 in the inspection area 122 is being inspected, the inspected display panel 200 on the rotatable bearing stage 30 in the loading-and-unloading area 121 can be transported to the discharging device 50 and, at the same time, the next to-be-inspected display panel 200 can be transported from the feeding device 20 to the surface of the rotatable bearing stage 30 in the loading-and-unloading area 121. As a result, the working time of the inspection apparatus 100 can be reduced, and the production efficiency of the inspection apparatus 100 can be significantly improved.

Please refer to FIG. 1. The inspection apparatus 100 of this embodiment is applicable to inspect the display panel. Preferably, the display panel can be an LCD display panel, an OLED display panel, a Q LED display panel, a curved-surface display panel or other display panel.

Please refer to FIGS. 1 through 3. The platform 10 includes a bottom plate 11 and a support frame 12. The support frame 12 is disposed on and supported by the bottom plate 11, and has a coordinate formed by X axis, Y axis and Z axis. The rotatable bearing stage 30, the rotation driving device 70 and the optical panel inspection device 40 all are disposed on and supported by the support frame 12. The support frame 12 is disposed between the feeding device 20 and the discharging device 50. The transfer device 60 is able to transfer the display panel 200 from the feeding device 20 to the rotatable bearing stage 30, and transfer the display panel 200 from the rotatable bearing stage 30 to the discharging device 50. The support frame 12 includes the loading-and-unloading area 121 and the inspection area 122, and the loading-and-unloading area 121 is located on the support frame 12 and at a rear side of the inspection area 122. The rotatable bearing stage 30 is rotatably disposed on the support frame 12. When the rotatable bearing stage 30 is rotated, the display panel 200 placed on the rotatable bearing stage 30 can be transferred between the loading-and-unloading area 121 and the inspection area 122.

Please refer to FIGS. 1 through 3. The feeding device 20 is disposed at a right side of the platform 10, and the discharging device 50 is disposed at a left side of the platform 10, that is, the discharging device 50 is disposed the other side of the platform 10 opposite to the feeding device 20. The feeding device 20 is configured to transport the cut display panel 200 to the rotatable bearing stage 30 along a feeding direction P. The discharging device 50 is configured to transport the display panel 200, inspected by the optical panel inspection device 40 already, to next process stage along the feeding direction P. The feeding direction P is substantially in parallel with the Y axis. The feeding device 20 and the discharging device 50 are disposed along the feeding direction P. The feeding device 20 and the discharging device 50 can have the same structures, or different structures.

Please refer to FIGS. 1 through 3. In this embodiment, the structures of the feeding device 20 and the discharging device 50 are the same basically, the feeding device 20 includes a feeding transmission belt 21 configured to place the display panel 200, and a feeding transmission mechanism 22 configured to rotate the feeding transmission belt 21. The feeding device 20 includes a feeding transmission belt 21 configured to place the display panel 200 and a feeding transmission mechanism 22 configured to rotate the feeding transmission belt 21. Preferably, the feeding transmission belt 21 and the discharging transmission belt 51 can be, but not limited to, belts. The feeding device 20 further includes a feeding machine 23 extended along the feeding direction P, a feeding transmission belt 21, and a feeding transmission mechanism 22 disposed on the feeding machine 23. The feeding transmission mechanism 22 controls the feeding transmission belt 21 to rotate, so that the display panel 200 placed on the feeding transmission belt 21 can be moved towards the platform 10 along the feeding direction P. Similarly. The discharging device 50 further includes a discharging machine 53 which is extended along the feeding direction P, a discharging transmission belt 51 and a discharging transmission mechanism 52 disposed on the discharging machine 53. The discharging transmission mechanism 52 controls the discharging transmission belt 51 to rotate, so that the display panel 200 placed on the discharging transmission belt 51 can be moved away from the platform 10 along the feeding direction P.

Particularly, the feeding transmission mechanism 22 can include a feed drive wheel, a feed driven wheel and a feeding motor. The feed drive wheel and the feed driven wheel are disposed at two ends of the feeding machine 23, and the feeding transmission belt 21 is wound on the feed drive wheel and the feed driven wheel. The feed drive wheel and the feed driven wheel can be provided with several transmission rollers and tensioner wheels, and the feeding motor is connected to the feed drive wheel and configured to rotate the feed drive wheel. The discharging transmission mechanism 52 can also include a discharge drive wheel, a discharge driven wheel and a discharging motor. The discharge drive wheel and the discharge driven wheel are disposed at two ends of the discharging machine 53, and the discharging transmission belt 51 is wound on the discharge drive wheel and the discharge driven wheel. The discharge drive wheel and the discharge driven wheel can be provided with several transmission rollers and tensioner wheels, and the discharging motor is connected to the discharge drive wheel and configured to rotate the discharge drive wheel.

Please refer to FIGS. 1 through 3. The rotatable bearing stage 30 is configured to place the display panel 200 thereon. The rotatable bearing stage 30 is disposed horizontally, so the rotation driving device 70 can drive the rotatable bearing stage 30 to rotate about a center part thereof horizontally. In this embodiment, the rotatable bearing stage 30 may include, but not limited to, a longer side and a shorter side, and the shorter side of the rotatable bearing stage 30 is longer than a length of the display panel 200, and the longer side of the rotatable bearing stage 30 is at least two times of a width of the display panel 200. It is to be understood that the two display panels 200 can be placed on the rotatable bearing stage 30 at the same time, and when the longer side of the rotatable bearing stage 30 is parallel with X axis (that is, the longer side of the rotatable bearing stage 30 is perpendicular to the feeding direction basically), the latter half of the rotatable bearing stage 30 is in the loading-and-unloading area 121, and the former half of the rotatable bearing stage 30 is in the inspection area 122, so that the display panel 200 on the former half of the rotatable bearing stage 30 can be inspected by the optical panel inspection device 40, and at the same time, the transfer device 60 can transfer the inspected display panel 200 from the latter half of the rotatable bearing stage 30 to the discharging device 50, and then transfer other to-be-inspected display panel 200 from the feeding device 20 to the latter half of the rotatable bearing stage 30.

Please refer to FIG. 1. The rotation driving mechanism 72 is configured to drive the rotation axis 71 to rotate the rotatable bearing stage 30. In this embodiment, the rotation driving mechanism 72 includes an electric rotating machine having an output shaft (not shown in FIG. 1), the electric rotating machine is fixed on the support frame 12, and the output shaft of the electric rotating machine is connected to and fixed with the rotation axis 71. The output shaft can be in transmission connection to the rotation axis 71 through a transmission device (not shown in FIG. 1). As a result, the electric rotating machine can drive the rotatable bearing stage 30 to rotate horizontally, so that the display panels 200 are exchanged between the loading-and-unloading area 121 and the inspection area 122 of the support frame 12.

Please refer to FIGS. 1 through 3. The transfer device 60 includes the sliding rail 61 extended along a direction in parallel with the feeding direction P; transport devices 62 and 63 slidably disposed on the sliding rail 61 and configured to pick up the display panel 200; a transport mechanism 64 configured to move the transport device 62. In this embodiment, the number of the transport devices 62 and 63 can be, but not limited to, two. The two transport devices 62 and 63 are driven by a transport mechanism 64. Preferably, the transport mechanism 64 can be, but not limited to, a screw mechanism. The two transport devices 62 and 63 are spaced from each other by a preset distance, and moved simultaneously when the display panels 200 are transferred between the feeding device 20 and the rotatable bearing stage 30, or between the rotatable bearing stage 30 and the discharging device 50.

Please refer to FIGS. 1 through 3. In this embodiment, the two transport devices 62 and 63 are the first transport device 62 shown at the right side of the sliding rail 61 of FIG. 1, and the second transport device 63 shown on the left side of the sliding rail 61 of FIG. 1. The first transport device 62 is configured to transport the to-be-inspected display panel 200 from the feeding device 20 to the rotatable bearing stage 30. The second transport device 63 is configured to transport the inspected display panel 200 from the rotatable bearing stage 30 to the discharging device 50. Each of the first transport device 62 and the second transport device 63 includes: a connection base 621 connected to the sliding rail 61; a lifting frame 622 slidably disposed on the connection base 621; a lift driving member 623 configured to longitudinally move the lifting frame 622 relative to the connection base 621 along a direction in parallel with Z axis; and a panel pickup mechanism 624. Preferably, the lift driving member 623 can be, but not limited to, a pneumatic cylinder. The connection base 621 is slidably connected to the sliding rail 61, and each of the first transport device 62 and the second transport device 63 further includes a horizontal sliding block 625 disposed between the connection base 621 and the lifting frame 622, and a sliding block driving member 626 configured to move the horizontal sliding block 625 relative to the connection base 621 along the direction in parallel with X axis. The horizontal sliding block 625 is slidably disposed on the connection base 621. Preferably, the sliding block driving member 626 can be, but not limited to, electric machinery. The panel pickup mechanism 624 is slidably disposed on the horizontal sliding block 625. As a result, when being driven by the transport mechanism 64, the panel pickup mechanism 624 can move along Y axis; when being driven by the sliding block driving member 626, the panel pickup mechanism 624 can move along X axis; and when being driven by the lift driving member 623, the panel pickup mechanism 624 can move along Z axis. After the panel pickup mechanism 624 picks up the display panel 200, the display panel 200 can be moved in sequential order of the feeding device 20, the rotatable bearing stage 30 and the discharging device 50. It is worth noting that, in this embodiment the first transport device 62 and the second transport device 63 are operated simultaneously, that is, the first transport device 62 can transport the to-be-inspected display panel 200 from the feeding device 20 to the rotatable bearing stage 30, and at the same time the second transport device 63 transports the inspected display panel 200 from the rotatable bearing stage 30 to the discharging device 50. After the first transport device 62 and the second transport device 63 move forth and back once, the display panel 200 can be transported to next process stage. The two display panels 200 picked by the two transport devices can be lifted and translated at the same time, and the first transport device 62 and the second transport device 63 both have the same stroke distances and process times substantially, so that the operation of loading-and-unloading the display panel 200 can be completed simultaneously, As a result, the process time can be decreased and the work efficiency can be improve. Preferably, the process time includes loading time and unloading time.

Particularly, the lifting frame 622 includes a connection support 6221 connected to the connection base 621, and a fixed support 6222 connected to the connection support 6221. The fixed support 6222 includes a rod 6223 extended along a direction in parallel with the feeding direction P, and a second rod 6224 disposed perpendicularly to the first rod 6223. Preferably, the number of the rod 6223 can be, but not limited to, two, and the number of the second rod 6224 can be, but not limited to, two. The panel pickup mechanism 624 includes two clamping rods 6241 slidably disposed on the second rod 6224 and extended along a direction in parallel with the feeding direction P, and a clamp driving member (not shown in FIGS.) configured to move the clamping rod 6241 relatively. Preferably, the clamp driving member can be, but not limited to, a pneumatic cylinder. Each clamping rod 6241 includes a contact member 6242 configured to contact against a side wall of the display panel 200, and the two clamping rods 6241 are moved towards each other to clamp the two sides of the display panel 200. Preferably, the contact member 6242 can be, but not limited to, elastic roller. It is to be understood that when the two clamping rods 6241 of the panel pickup mechanism 624 clamps the front and rear side edges of the display panel 200, the display panel 200 can be clamped tightly to transport, by actions of the transport mechanism 64, the sliding block driving member 626 and the lift driving member 623, to next process stage. The panel pickup mechanism 624 can effectively reduce shake of the display panel 200 during transportation, so that the display panel 200 can be transported more smoothly.

In an embodiment, the contact member 6242 can be an elastic member such as rubber or silica gel.

In an embodiment, the panel pickup mechanism 624 can also use a chuck structure to perform vacuum adsorption on the display panel 200.

Please refer to FIGS. 1 through 3. The optical panel inspection device 40 inspects the display panel 200 placed on the rotatable bearing stage 30 in the inspection area 122. The optical panel inspection device 40 can be any existing inspection device for display panel, and can include a probe mechanism 41, a high-powered microscope head (not shown in figures) and a CCD 42. The optical panel inspection device 40 is disposed in the inspection area 122 of the support frame 12 to inspect the display panel 200 on the rotatable bearing stage 30 in the inspection area. It is worth noting that, every time the rotatable bearing stage 30 rotates, the rotatable bearing stage 30 rotates by 180° horizontally, the operations of inspecting the display panels 200 and loading-and-unloading the display panel 200 can be implemented on the rotatable bearing stage 30 at the same time, As a result, the entire process can be operated more quickly in high efficiency.

In the embodiment of the present disclosure, the display panel to be inspected by the testing apparatus can be LCD panel or PDP panel.

Please refer to FIGS. 1 through 4. This embodiment provides a testing method for display panel which can be applied to the inspection apparatus 100. The testing method for display panel includes following steps.

Figure 4:
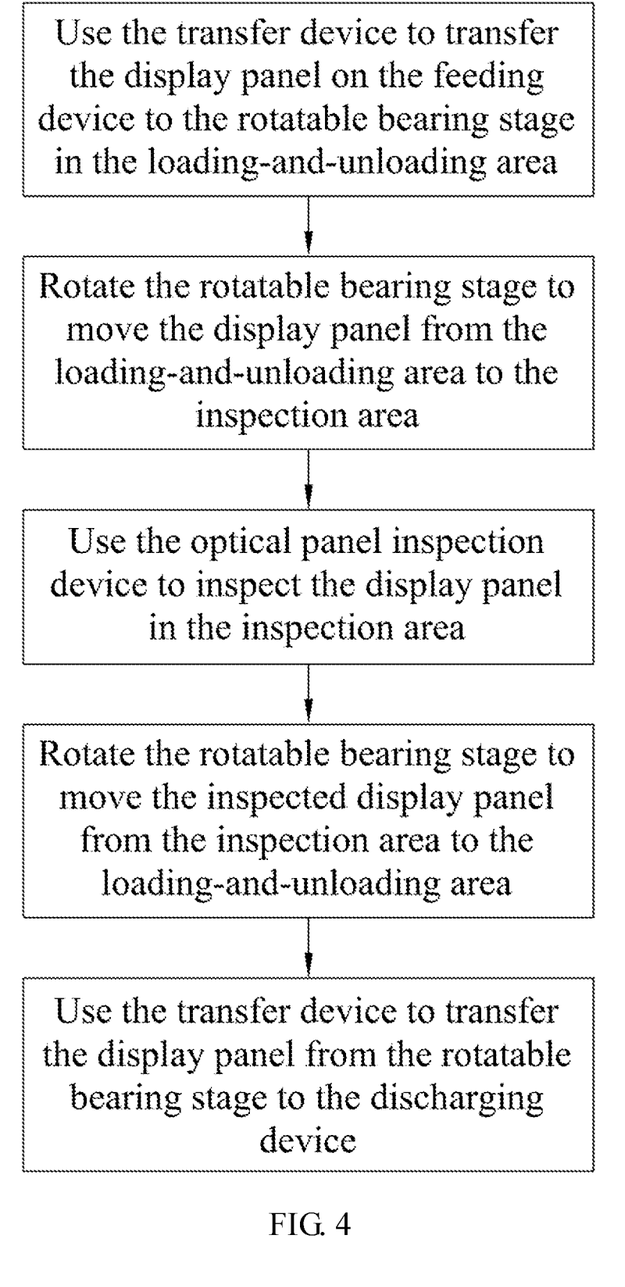
FIG. 4 is a flow chart of a testing method for display panel, in accordance with an embodiment of the present disclosure.

The first transport device 62 of the transfer device 60 is moved to over the feeding device 20, and then pick up the to-be-inspected display panel 200 placed on the feeding device 20, and at the same time, the second transport device 63 is moved to over the rotatable bearing stage 30 to pick up the inspected display panel 200 on the rotatable bearing stage 30 in the loading-and-unloading area 121.

Next, the first transport device 62 transports the to-be-inspected display panel 200 to the surface of the rotatable bearing stage 30 in the loading-and-unloading area 121, and at the same time, the second transport device 63 transports the inspected display panel 200 to the discharging device 50.

Next, the rotatable bearing stage 30 is rotated about the rotation axis 71 by 180° after the inspection for the display panel 200 on the rotatable bearing stage 30 in the inspection area 122 is completed.

The optical panel inspection device 40 inspects the to-be-inspected display panel 200, and at the same time, the first transport device 62 and the second transport device 63 respectively transport next to-be-inspected display panel 200 to the surface of the rotatable bearing stage 30 in the loading-and-unloading area 121, and transport the display panel 200 in the loading-and-unloading area 121 to the discharging device 50, respectively.

According to the technical solution of the testing method for display panel of the present disclosure, only single inspection apparatus 100 is need for the production line, so the manufacturing cost can be reduced; furthermore, the working time of inspection (such as the panel exchanging time plus the auto-inspection time of the optical panel inspection device 40) is also reduced, so the production efficiency can be doubled.

The present disclosure disclosed herein has been described by means of specific embodiments. However, numerous modifications, variations and enhancements can be made thereto by those skilled in the art without departing from the spirit and scope of the disclosure set forth in the claims.

What is claimed is:

1. An inspection apparatus for a display panel, comprising:
    a platform comprising a bottom plate and a support frame disposed on the bottom plate, wherein the support frame comprises a loading-and-unloading area and an inspection area;
    a feeding device configured to transport the display panel along a feeding direction, and disposed at a side of the platform;
    a rotatable bearing stage configured to place the display panel thereon;
    an optical panel inspection device configured to inspect the display panel placed on the rotatable bearing stage in the inspection area, wherein the optical panel inspection device is disposed on the support frame;
    a discharging device configured to transport, along the feeding direction, the display panel inspected by the optical panel inspection device, wherein the discharging device is disposed at the other side of the platform opposite to the feeding device;
    a rotation driving device fastened on the support frame and comprising a rotation axis and a rotation driving mechanism, wherein the rotation axis has an end fixed at a central part of a bottom surface of the rotatable bearing stage, and the rotation driving mechanism is configured to rotate the rotation axis, an axis of the rotation axis is perpendicular to the bottom plate, and the display panel placed on the rotatable bearing stage is exchanged between the loading-and-unloading area and the inspection area when the rotatable bearing stage is rotated; and
    a transfer device configured to transfer the display panel from the feeding device to a surface of the rotatable bearing stage in the loading-and-unloading area, and transfer the inspected display panel from the loading-and-unloading area to the discharging device after the display panel is inspected by the optical panel inspection device;
    wherein the feeding device comprises:
    a feeding transmission belt configured to place the display panel thereon; and
    a feeding transmission mechanism configured to rotate the feeding transmission belt;
    wherein the feeding transmission mechanism comprises:
    a feed drive wheel;
    a feed driven wheel; and
    a feeding motor configured to drive the feed drive wheel to rotate;
    wherein the feeding transmission belt is wound on the feed drive wheel and the feed driven wheel.

2. The inspection apparatus according to claim 1, wherein the transfer device comprises:
    a sliding rail extended along a direction in parallel with the feeding direction;
    at least two transport devices slidably disposed on the sliding rail and configured to pick up the display panel; and
    a transport mechanism configured to move the transport device.

3. The inspection apparatus according to claim 2, wherein the transport device comprises:
    a connection base connected to the sliding rail;
    a lifting frame slidably disposed on the connection base;
    a lift driving member configured to move the lifting frame relative to the connection base; and
    a panel pickup mechanism disposed on the lifting frame.

4. The inspection apparatus according to claim 3, wherein the lifting frame comprises:
    a connection support connected to the connection base; and
    a fixed support connected to the connection support;
    wherein the fixed support comprises:
    at least two rods extended along a direction in parallel with the feeding direction; and
    at least two second rods perpendicular to a first rod;
    wherein the panel pickup mechanism comprises:
    at least one pair of clamping rods slidably disposed on the second rod and extended along a direction in parallel with the feeding direction; and a clamp driving member configured to move the at least one pair of clamping rods opposite to each other;

wherein each of the clamping rods comprises a contact member configured to contact against a side wall of the display panel, and each of at least one pair of clamping rods are moved towards each other to clamp the two sides of the display panel.

5. The inspection apparatus according to claim 1, wherein the discharging device comprises:
a discharging transmission belt configured to place the display panel thereon; and
a discharging transmission mechanism configured to rotate the discharging transmission belt;
wherein the discharging transmission mechanism comprises:
a discharge drive wheel;
a discharge driven wheel; and
a discharging motor configured to drive the discharge drive wheel to rotate;
wherein the discharging transmission belt is wound on the discharge drive wheel and the discharge driven wheel.

6. The inspection apparatus according to claim 1, wherein the rotation driving mechanism comprises an electric rotating machine comprising an output shaft, the electric rotating machine is fixed on the support frame, and the output shaft of the electric rotating machine is connected to and fixed with the rotation axis.

7. The inspection apparatus according to claim 1, wherein the optical panel inspection device is configured to inspect the display panel placed on the rotatable bearing stage in the inspection area, and the optical panel inspection device comprises a probe mechanism, a high-powered microscope head, and a charge-coupled device.

8. An inspection apparatus for a display panel, comprising:
a platform comprising a bottom plate and a support frame disposed on the bottom plate, wherein the support frame comprises a loading-and-unloading area and an inspection area;
a feeding device configured to transport the display panel along a feeding direction, and disposed at a side of the platform;
a rotatable bearing stage configured to place the display panel thereon;
an optical panel inspection device configured to inspect the display panel placed on the rotatable bearing stage in the inspection area, wherein the optical panel inspection device is disposed on the support frame;
a discharging device configured to transport, along the feeding direction, the display panel inspected by the optical panel inspection device, wherein the discharging device is disposed at the other side of the platform opposite to the feeding device;
a rotation driving device fastened on the support frame and comprising a rotation axis and a rotation driving mechanism, wherein the rotation axis has an end fixed at a central part of a bottom surface of the rotatable bearing stage, and the rotation driving mechanism is configured to rotate the rotation axis, an axis of the rotation axis is perpendicular to the bottom plate, and the display panel placed on the rotatable bearing stage is exchanged between the loading-and-unloading area and the inspection area when the rotatable bearing stage is rotated;
a transfer device configured to transfer the display panel from the feeding device to a surface of the rotatable bearing stage in the loading-and-unloading area, and transfer the inspected display panel from the loading-and-unloading area to the discharging device after the display panel is inspected by the optical panel inspection device;
wherein the transfer device comprises:
a sliding rail extended along a direction in parallel with the feeding direction;
at least two the transport devices slidably disposed on the sliding rail and configured to pick up the display panel; and
a transport mechanism configured to move the transport device;
wherein the transport device comprises:
a connection base connected to the sliding rail;
a lifting frame slidably disposed on the connection base;
a lift driving member configured to move the lifting frame relative to the connection base; and
a panel pickup mechanism disposed on the lifting frame;
wherein each of at least two the transport devices comprises a horizontal sliding block disposed between the connection base and the lifting frame, and a sliding block driving member configured to move the horizontal sliding block relative to the connection base.

9. The inspection apparatus according to claim 8, wherein the lifting frame comprises:
a connection support connected to the connection base; and
a fixed support connected to the connection support;
wherein the fixed support comprises:
at least two the rods extended along a direction in parallel with the feeding direction; and
at least two the second rods perpendicular to the first rod;
wherein the panel pickup mechanism comprises:
at least one pair of clamping rods slidably disposed on the second rod and extended along a direction in parallel with the feeding direction; and
a clamp driving member configured to move the clamping rods opposite to each other;
wherein each of the clamping rods comprises a contact member configured to contact against a side wall of the display panel, and the clamping rods are moved towards each other to clamp the two sides of the display panel.

10. The inspection apparatus according to claim 9, wherein the feeding device comprises:
a feeding transmission belt configured to place the display panel thereon; and
a feeding transmission mechanism configured to rotate the feeding transmission belt;
wherein the feeding transmission mechanism comprises:
a feed drive wheel;
a feed driven wheel; and
a feeding motor configured to drive the feed drive wheel to rotate;
wherein the feeding transmission belt is wound on the feed drive wheel and the feed driven wheel.

11. The inspection apparatus according to claim 9, wherein the discharging device comprises:
a discharging transmission belt configured to place the display panel thereon; and
a discharging transmission mechanism configured to rotate the discharging transmission belt;
wherein the discharging transmission mechanism comprises:
a discharge drive wheel;

a discharge driven wheel; and a discharging motor configured to drive the discharge drive wheel to rotate;

wherein the discharging transmission belt is wound on the discharge drive wheel and the discharge driven wheel.

12. The inspection apparatus according to claim 9, wherein the rotation driving mechanism comprises an electric rotating machine comprising an output shaft, the electric rotating machine is fixed on the support frame, and the output shaft of the electric rotating machine is connected to and fixed with the rotation axis.

13. The inspection apparatus according to claim 9, wherein the optical panel inspection device is configured to inspect the display panel placed on the rotatable bearing stage in the inspection area, and the optical panel inspection device comprises a probe mechanism, a high-powered microscope head and a charge-coupled device.

14. A testing method for display panel, comprising:

providing a platform, a feeding device, a rotatable bearing stage, an optical panel inspection device, a discharging device, a rotation driving device and a transfer device, wherein the platform comprises a support frame having a loading-and-unloading area and an inspection area;

using the transfer device to transfer the display panel on the feeding device to the rotatable bearing stage in the loading-and-unloading area;

rotating the rotatable bearing stage to move the display panel from the loading-and-unloading area to the inspection area;

using the optical panel inspection device to inspect the display panel in the inspection area;

rotating the rotatable bearing stage to move the inspected display panel from the inspection area to the loading-and-unloading area; and using the transfer device to transfer the display panel from the rotatable bearing stage to the discharging device;

wherein the feeding device is provided to comprise:

a feeding transmission belt configured to place the display panel thereon; and a feeding transmission mechanism configured to rotate the feeding transmission belt;

wherein the feeding transmission mechanism comprises:

a feed drive wheel;

a feed driven wheel; and a feeding motor configured to drive the feed drive wheel to rotate;

wherein the feeding transmission belt is wound on the feed drive wheel and the feed driven wheel.

15. The testing method for display panel according to claim 14, further comprising:

disposing the platform between the feeding device and the discharging device.

16. The testing method for display panel according to claim 15, wherein the step of using the optical panel inspection device to inspect the display panel in the inspection area, further comprises:

using the transfer device to transfer the display panel from the rotatable bearing stage to the discharging device; and using the transfer device to transfer the display panel from the feeding device to the rotatable bearing stage in the loading-and-unloading area.

17. The testing method for display panel according to claim 15, wherein the step of providing the transfer device further comprises:

providing a sliding rail, at least two transport devices and a transport mechanism, wherein the sliding rail is extended in parallel with a direction in which the feeding device transports the display panel, and the at least two transport devices are slidably disposed on the sliding rail;

using the at least two transport device to pick up the display panel; and using the transport mechanism to move the at least two transport devices.

18. The testing method for display panel according to claim 17, wherein the step of providing at least two transport devices further comprises:

providing a base connected to the sliding rail;

slidably disposing a lifting frame on the base;

providing a lift driving member to move the lifting frame relative to the connection base; and disposing a panel pickup mechanism on the lifting frame.

19. The testing method for display panel according to claim 18, further comprising:

disposing a horizontal sliding block between the connection base and the lifting frame; and providing a sliding block driving member to drive the horizontal sliding block to move relative to the connection base.

\* \* \* \* \*